United States Patent [19]

Pitts, Jr. et al.

[11] 4,002,903
[45] Jan. 11, 1977

[54] SIMULTANEOUS THERMAL NEUTRON DECAY TIME AND SHALE COMPENSATED CHLORINE LOG SYSTEM

[75] Inventors: Robert W. Pitts, Jr.; Hubert D. Scott, both of Houston, Tex.

[73] Assignee: Texaco Inc., New York, N.Y.

[22] Filed: Mar. 7, 1975

[21] Appl. No.: 556,513

[52] U.S. Cl. .............................. 250/267; 250/262; 250/270

[51] Int. Cl.² ......................................... G01V 5/00

[58] Field of Search ................... 250/262, 270, 267

[56] References Cited

UNITED STATES PATENTS

| | | | |
|---|---|---|---|
| 3,413,471 | 11/1968 | Tittman | 250/270 |
| 3,772,513 | 11/1973 | Hall et al. | 250/262 |
| 3,868,505 | 2/1975 | Jacobson et al. | 250/270 |
| R28,477 | 7/1975 | Nelligan | 250/270 |

*Primary Examiner*—Harold A. Dixon
*Attorney, Agent, or Firm*—Thomas H. Whaley; Carl G. Ries

[57] ABSTRACT

Earth formations surrounding a well borehole are repetitively bombarded with bursts of high energy neutrons. A radiation detector in a sonde in the borehole senses the gamma rays induced by the capture of thermal neutrons and sends representative signals to the surface. At the surface electronics, the population of thermal neutron capture gamma rays at two separate and distinct times is measured. The macroscopic thermal neutron capture cross section of the formation may be thus determined and logged. Further, two additional single channel energy analyzers, such as from 1.30 to 2.92 Mev and from 3.43 to 10.0 Mev, sense formation capture gamma ray response over a common time interval following each neutron burst. The measurements made in these two additional single channel analyzers are used to distinguish between the presence of salt water and hydrocarbons in the formation, which is also logged.

19 Claims, 8 Drawing Figures

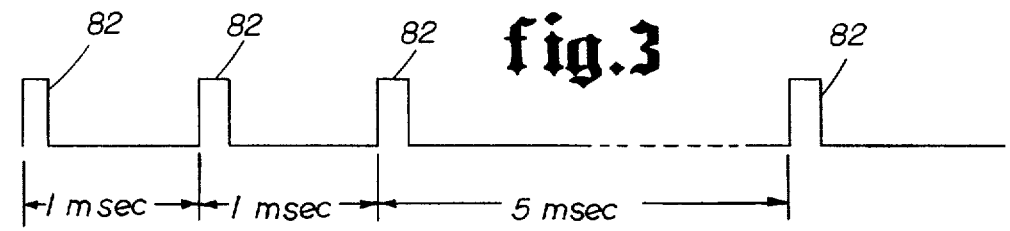
fig.3
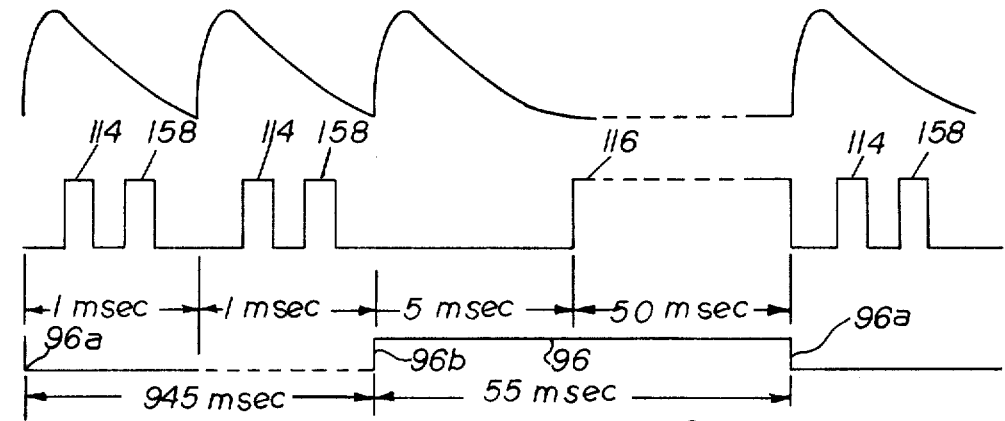
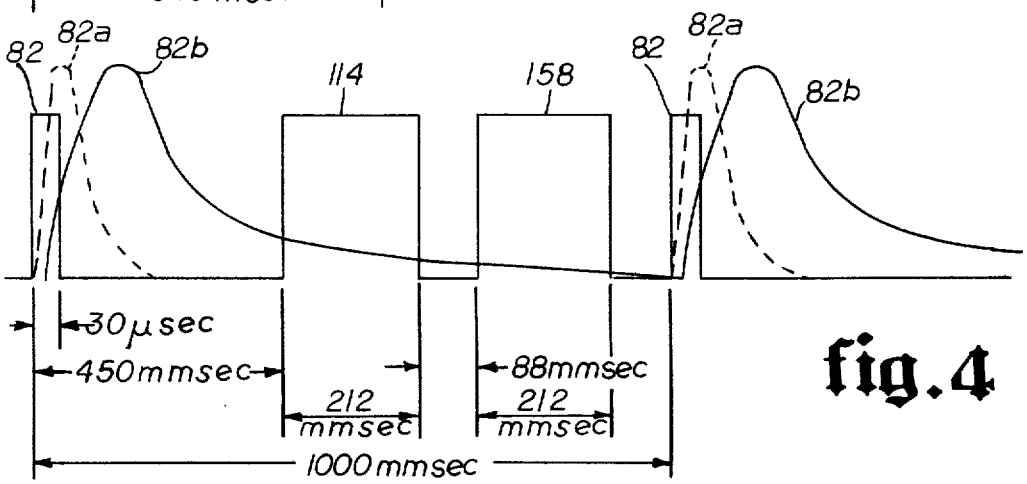
fig.4
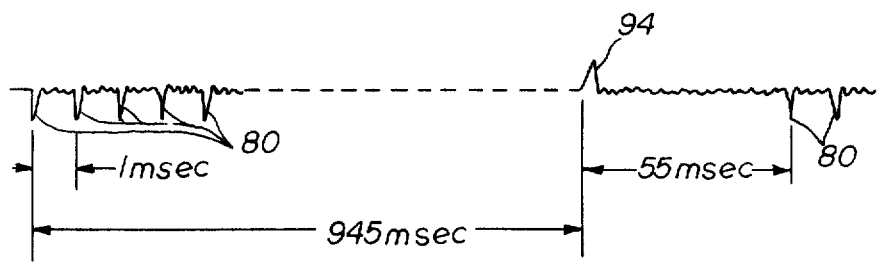
fig.5

SIMULTANEOUS THERMAL NEUTRON DECAY TIME AND SHALE COMPENSATED CHLORINE LOG SYSTEM

BACKGROUND OF INVENTION

1. FIELD OF INVENTION:

The present invention relates to radioactive well logging.

2. DESCRIPTION OF PRIOR ART:

It has been known in radioactive well logging to measure and log thermal neutron decay or thermal neutron lifetime in the formation surrounding the borehole, as in U.S. Pat. No. 3,733,486. However, for highly accurate quantitative interpretation of this type of log, it is often necessary to know accurately certain parameters, such as formation porosity, fluid salinity, and shale fraction of the formation as well as the macroscopic thermal neutron capture cross section, $\Sigma$, of the formation matrix. Where certain of these parameters could only be roughly estimated, quantitative interpretation of this type of log is often unsatisfactory.

In other types of logging, as in U.S. Pat. No. 3,772,513 to distinguish oil zones from water zones in the formations, also known as chlorine logging, only formation water salinity is required to be accurately known, since a satisfactory interpretation of the log can generally be made with only an estimate of formation porosity. However, this type of log is subject to errors caused by variations of borehole effects or parameters, such as those resulting from washouts, poor cementation, borehole size variations and the like. In contrast, the thermal neutron decay log is less sensitive to borehole effects and generally has greater depths of investigation horizontally into the formation than the chlorine log.

Thus, the two types of logs discussed above, although they can essentially serve as substitutes for each other, are also complimentary in several ways. However, the expense of running both logs on the same well, requiring a separate run of two different logging tools, has, in the past, been too high to justify the more definite results which would be produced.

SUMMARY OF THE INVENTION

The present invention relates to radioactivity well logging for investigation of subsurface earth formations in a well borehole. Discrete bursts of high energy neutrons are repetitively emitted from a neutron source in a logging instrument during an irradiation time interval in a first portion of an operating cycle to bombard the earth formations and produce a thermal neutron population in the borehole and formations. The thermal neutrons are captured by the elements in the formation and borehole and cause the elements to emit thermal neutron capture gamma rays which are detected with a detector in the logging instrument.

The detected capture gamma radiation in an energy range of from about 0.2 to about 10 Mev (or thus for substantially all elements) is sensed during first and second detection time intervals occurring at different times from each other after each irradiation time interval to obtain a measure of the rate of decrease of the thermal neutron population.

A portion of the detected radiation in a first energy subrange (or band) which includes a significant part of the capture gamma ray spectrum of hydrogen is sensed during the measurement time interval. Also during the measurement interval, the capture gamma radiation in a second energy band distinct from the first energy band is sensed. The rate of decrease of the thermal neutron population is used to derive a measure of the macroscopic thermal neutron capture cross section of the formation. Simultaneously, the radiation sensed in the first and second energy sublevels or bands is used to derive a measure of the relative presence of hydrogen and chlorine in the formation. In this manner, both the thermal neutron lifetime and chlorine log are obtained from a single pass of the logging instrument in the borehole.

Periodically during the operating cycle of the system, the background gamma radiation in the borehole is detected during a background counting interval. The background radiation so detected is used as a compensating factor during the derivation of both the macroscopic thermal neutron capture cross section and the determination of the relative presence of hydrogen and chlorine in the formation.

The logging instrument is sleeved with a material having a characteristic capture gamma radiation predominantly within the aforementioned first energy band and substantially outside the second energy band. This assists in discriminating betwwen the relative presence of salt water and hydrocarbons in the formation.

BRIEF DESCRIPTION OF THE DRAWINGS:

FIGS. 3, 4 and 5 are signal waveform and timing diagrams of signals present in the apparatus of FIG. 1;

Figure 1:
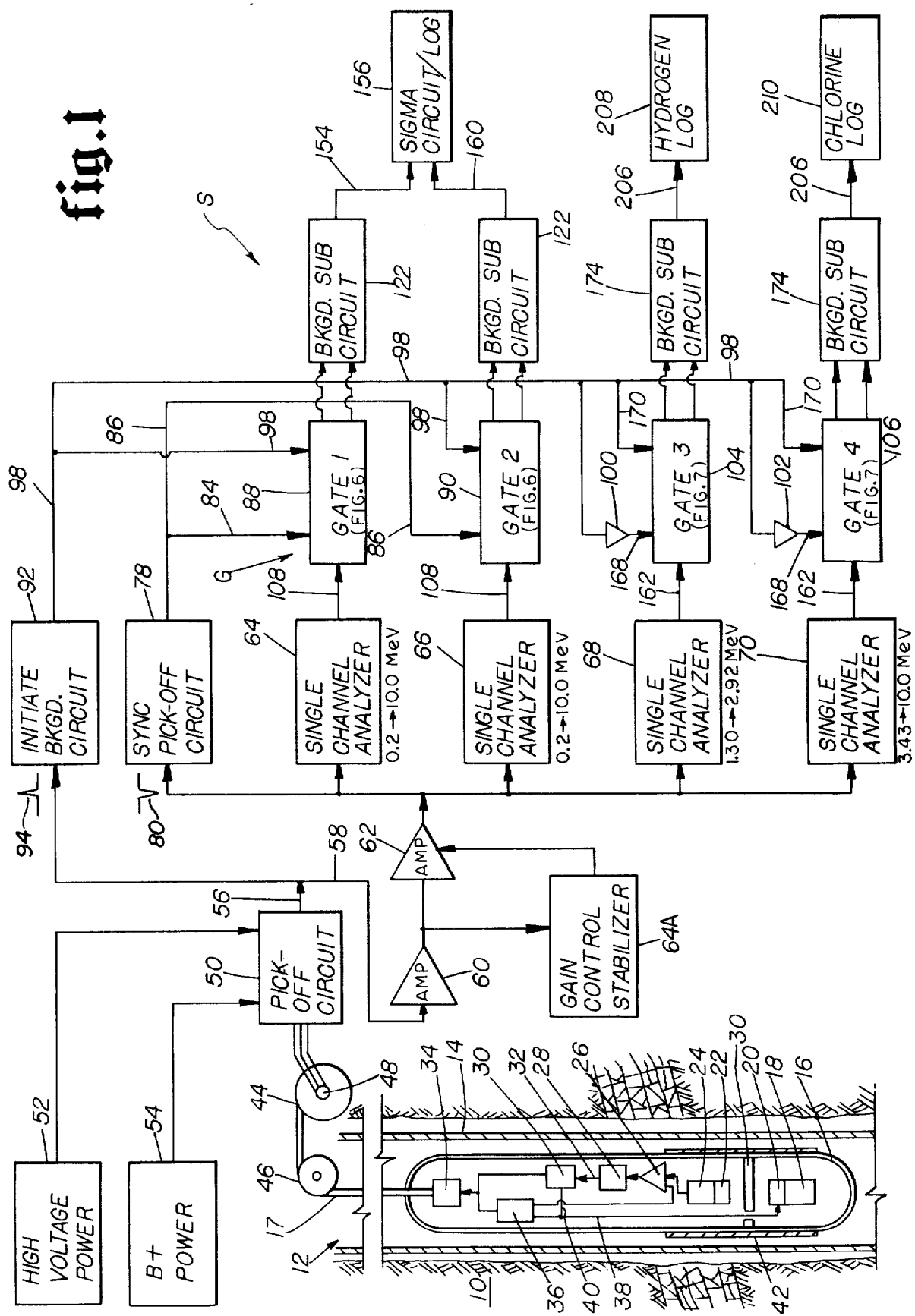
FIG. 1 is a schematic diagram of the system of the present invention.

DESCRIPTION OF PREFERRED EMBODIMENT:

Referring initially to FIG. 1, the system of the present invention for radioactivity well logging to investigate subsurface earth formations 10 traversed by a borehole 12 which contains a conventional well casing 14 is illustrated. The system includes a fluid tight hollow well tool or sonde 16 which is suspended in the casing 12 at the lower end of a well logging cable 17.

The sonde 16 contains a source 18 of high energy neutrons in its lower end. Preferably source 18 comprises an ion accelerator employing the well known deuterium-tritium reaction to produce a gamma-free flux of neutrons of an energy level of 14 Mev. A control circuit 20 is electrically coupled to the accelerator 18 for energizing the accelerator 18 to repetitively emit 14 Mev neutrons in discrete bursts or pulses. The emitted bursts of high energy neutrons bombard the earth formation 10 and the mean speed of the neutrons is rapidly reduced to the thermal neutron speed of $2.2 \times 10^5$ cm/sec. The thermal neutrons are then absorbed by the nuclei of constituent elements comprising the formation 10 and the borehole fluid 12 in accordance with the relative thermal neutron capture cross sections of the nuclei, causing the composition elements to emit characteristic neutron capture gamma rays.

The sonde 16 is provided with at least one energy proportional radiation detector. Such a detector may comprise, for example, a scintillation detector in the form of an optically transparent thallium-activated crystal 22 of sodium iodide or the like with an end-window photomultiplier tube 24 optically coupled to the crystal 22. A suitable amplifier 24 receives the output electrical pulses generated in the tube 24 and linearly amplifies such pulses. It also receives calibration pulses from a pulse 36 which are mixed with the data pulses at the input of amplifier 26 using resistive coupling. The amplified pulses are provided to a discriminator 28 which has a trigger level set at a preselected lower energy to be discussed subsequently.

The crystal 22 is preferably spaced close enough, for example approximately 20 ⅞", to the accelerator 18 to sense a representative number of capture gamma rays entering the borehole 12 as a result of the neutron bombardment. A suitable neutron shield 30 is preferably interposed between the crystal 22 and the accelerator 18 to limit neutron bombardment of the crystal 22 by the source 18.

A summing amplifier 30 is preferably arranged and adapted to amplify the output of the discriminator 28 and sum therein data pulses and sync pulses generated by the pulser 36. The sync pulses from pulser 36 are also supplied to the neutron generator 18 and control circuit 20 to cause activation of the accelerator at a rate determined thereby for a predetermined time duration which is programmed into the control circuit 20.

Surrounding the housing of the sonde 16 in the vicinity of the detector 22 is a sleeve 42 of a thermal neutron-absorbing material such as samarium in the form of a coating of samarium oxide ($Sm_2O_3$), which is preferably included in a binder or matrix of epoxy or other suitable resin. The samarium shield 42 is one type of suitable material for use according to the present invention which has a characteristic neutron capture gamma radiation emission spectrum predominantly within an energy band, to be described in detail below, which includes a significant part of the neutron capture gamma spectrum of certain elements in the formation. The samarium shield 42 further has a characteristic neutron capture gamma radiation emission spectrum substantially outside another energy band. Further details concerning this shale compensating effect of the sleeve 42 are set forth in U.S. Pat. No. 3,772,513, and "The Shale-Compensated Chlorine Log", *Journal of Petroleum Technology*, Volume 27, page 164 to 170.

While samarium is preferred as the material for the sleeve 42, it is to be understood that other materials may be employed rather than samarium, and that other materials may be employed together with samarium. For example, europium or gadolinium may also be employed as the material for the sleeve 42, since these materials possess generally similar characteristic neutron capture gamma radiation emission spectra to samarium.

Considering now a surface control and monitoring network S (FIG. 1) of the system, a conventional cable reel or hoist 44 receives unused portions of the logging cable 17 while permitting the cable 17 to be passed over a conventional sheave or measuring wheel 46 into the borehole 12 as the sonde 16 is lowered therethrough. Suitable conventional commutating slip rings 48 are provided with the hoist 44 to permit high voltage power to be provided through a conventional pick-off circuit 50 from a high voltage power supply 52 in order to provide operating power for photomultiplier tube 24 in the sonde 16. The pick-off circuit 50 further receives operating direct current bias power from a power supply 54 to drive the amplifier 26 and furnish power to the accelerator 18 in the sonde 16. Since the connections within the sonde 16 between the cable 17 to provide operating power to the amplifer 28, photomultiplier tube 24 and accelerator 18 are conventional, they are not set forth in the drawing to preserve clarity therein.

A conductor 56 and a conductor 58 electrically connect the logging cable 17 through the slip rings 48 to a buffer amplifier 60 so that pulses from the cable driving network 34 in the sonde 16 are provided to the surface control network S. A gain control amplifier 62, whose gain is controlled by a conventional gain control stabilizer circuit 64 (this circuit might be a type NA-22 as sold by Harshaw Chemical Company) provides the signals from the sonde 16 for analysis and processing in the surface control network S in a manner to be set forth.

A plurality of single channel pulse height analyzers 64, 66, 68 and 70 receive the output data pulses from the gain control amplifier 62. The analyzers 64 and 66 process the incoming pulses from the amplifier 62 based on the height or amplitude of the incoming pulses that occur at the height or amplitude of the incoming pulses that occur at the Mev energy level or channels to which these analyzers are biased. The analyzers 64 and 66 are biased to include the Mev energy levels of, for example, from 0.2 to 10.0 Mev, or substantially the entire capture gamma spectrum of known elements present in well boreholes and formations adjacent such boreholes. The output pulses of analyzers 64 and 66 are gated using gates 88 and 90. These gates are time controlled by the outputs of the initiate background circuit 92, and the sync pick-off circuit 18.

Figure 2:
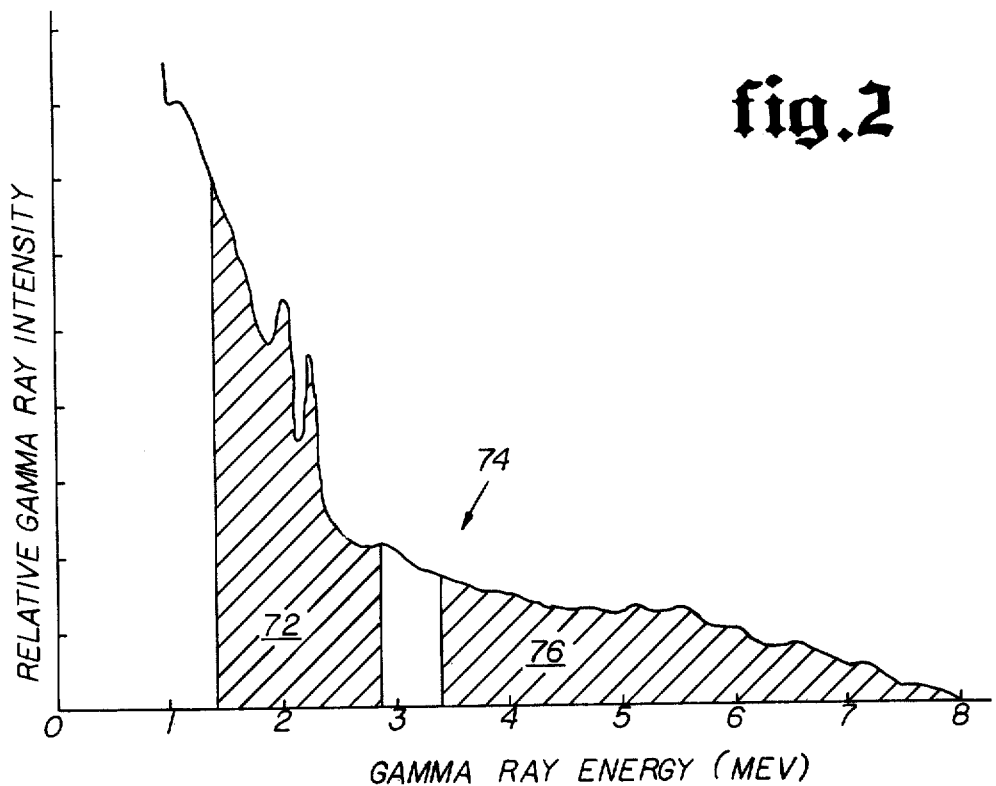
FIG. 2 is an example plot of relative capture gamma ray intensity as a function of gamma ray energy level for a well borehole.

The analyzer 68 is biased to a more limited energy band of from 1.30 to 2.92 Mev, as indicated by a shaded region 72 (FIG. 2) in a plot 74 of an example relative gamma ray intensity versus gamma ray energy (Mev) plot for a typical well borehole at a particular interval of time. This energy band is also the energy band in which the material of the shield 42 emits gamma radiation in response to neutron bombardment from the source 18 so that the data pulses counted by the analyzer 68 are primarily sensitive to hydrogen and relatively insensitive to the effect of chlorine in the borehole and formations. The analyzer 70 is biased at Mev energy levels from 3.43 to 10.0 Mev. This energy band 76 is indicative of the chlorine content of the formation since chlorine emits many thermal neutron capture gamma rays in the range of from about 4 to 8 Mev. Accordingly, by biasing the analyzers 68 and 70 to separate and distinct energy bands, and by using the sleeve 42 two signals, one from the analyzer 68 indicative of the relative amount of hydrogen and the other from the analyzer 70 and indicative of the amount of chlorine, are formed.

Considering the gating circuit G more in detail, a synchronization pick-off circuit 78 receives negative going sync pulses 80 (FIG. 5) from the pulser 36 in the sonde 16. The pulser 36 is of the type set forth, for example, in U.S. Pat. No. 3,733,486 which provides negative going pulses 80 in synchronism with the emission of neutron pulses 82 (FIG. 3) every one millisecond for a 945 millisecond measurement portion of a one second operating cycle of the system. Neutron pulses 82 gives rise to a succession of fast neutron populations illustrated by a waveform 82a in phantom and a succession of thermal neutron populations illustrated by a waveform 82b.

The synchronization or "sync" pick-off circuit 78 provides output pulses in synchronism with the one millisecond pulses 80 over conductors 84 and 86 to a Gate 1 gating circuit 88 and Gate 2 gating circuit 90, respectively. The Gate 1 gating circuit 88 is connected to the analyzer 64, while the Gate 2 gating circuit 90 is connected to the analyzer 66. The sync pick-off circuit 78 thus provides output pulses to the gating circuits 88 and 90 for the 945 millisecond measurement portion of the operating cycle of the system. These pulses from the pick-off circuit 78 control the operation of the gates 88 and 90 to be set forth below.

An initiate background circuit 92 of the gating circuits G is a suitable bistable digital circuit which receives a positive going control pulse 94 (FIG. 5) provided over the cable 17 from the pulser 36 in the sonde 16. The initiate background circuit 90 responds to the pulse 94 by changing logic levels from logic level "0" to logic "1" of an output waveform 96 present on a conductor 98. The initiate background circuit 92 further changes logic levels from logic "1" to logic "0" in response to the first negative going pulse 80 formed when the first neutron pulse in the measurement portion of an operating cycle of the system takes place, as indicated at 96a (FIG. 5). The output waveform of the initiate background circuit 92 present on conductor 98 is provided to the gates 88 and 90 and is further provided both in uninverted form from the conductor 98 and in inverted form through inverters 100 and 102 to Gate 3 gating circuit 104 and Gate 4 gating circuit 106, respectively, to control the operation of circuits therein, as will be set forth.

Figure 6:
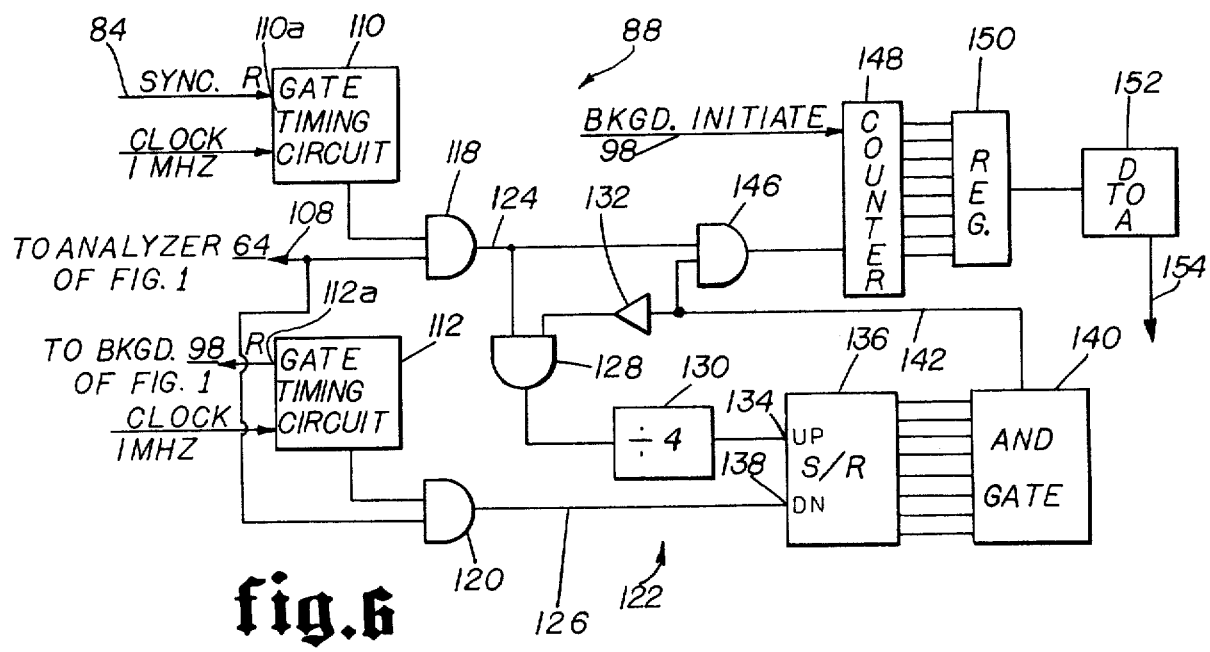
FIGS. 6 and 7 are schematic electrical circuit diagrams of portions of the system of FIG. 1.

Considering the gating circuits 88 and 90 more in detail, these circuits are like in construction and function with the exception of a time constant of one component thereof to be set forth, and accordingly are exemplified by the circuit 88 (FIG. 6). Gating circuit 88 (FIG. 6) receives data pulses from analyzer 64 representing detection of capture gamma rays in the energy range of from 0.2 to 10 Mev over a conductor 108. Operation of the gating circuit 88 is controlled by gate timing circuits 110 and 112 which receive pulses at their respective terminals 110a and 112a from the sync pick-off circuit 78 over conductor 84 and from the initiate background circuit 92 over the conductor 98, respectively. The timing circuits 110 and 112 further receive clock signals from a conventional master one megahertz operating clock (not shown).

The gate timing circuit 110 is a conventional pulse forming circuit which forms a Gate 1 pulse 114 (FIGS. 3 and 4) of 212 microseconds duration after a 450 microsecond time delay (FIG. 4) in response to the time delay circuit at its input.

The gating circuit 112 (FIG. 6) is another conventional pulse forming circuit with an input time delay which forms a 50 millisecond pulse 116 (FIG. 3) at a five millisecond delay interval after the background initiate waveform 96 changes level. Duringg the measurement portion of the operating cycle pulse 114 from the circuit 110 enables data pulses on conductor 108 to pass through an AND gate 118. During the background portion of the operating cycle the pulse 116 from the circuit 112 enables data pulses to pass through an AND gate 120 for counting background radiation.

The pulses passing through the AND gate 118 represent a first time sampling of the thermal neutron capture gamma radiation occurring at a first time interval, namely pulse interval 114 defined by circuit 110, after the emission burst 82 of neutrons and serve as one of two measurements necessary to measure the rate of thermal neutron decay and thus the macroscopic thermal neutron capture cross section $\Sigma$ of the formation 10. The pulses passing through the gate 120 occur during the pulse interval 116 defined by circuit 112, and subsequent to the first 945 millisecond portion of the operating cycle of the apparatus A. The pulses from analyzer 64a passing through gate 120 thus represent the residual background radiation after the thermal neutron capture gamma radiation has declined to negligible proportions. Using these, data compensation can be made, in a manner to be set forth, for the residual background radiation present at the detector.

A thermal neutron decay time background subtraction circuit denoted generally by 122 receives the pulses from the gates 118 and 120 over conductors 124 and 126. Since gate 118 is open for 945 intervals of 212 microseconds during the 945 millisecond mesurement portion of the operating cycle, or 200 milliseconds, while the gate 120 is only open for 50 milliseconds, compensation for the relative differences in operating time must be made. Accordingly, a switching input gate 128 permits gamma ray data pulses to pass from gate 118 to a divide by four digital counter 130 until disabled by a signal from an inverter 132. The divide by four counter 130 provides one output pulse for each four input pulses from the gate 118 while enabled by gate 128 to an up count input terminal 134 of a counter 136. The counter 136 counts up one count in response to receipt of each pulse at the input terminal 134.

The counter 136 further counts down one count in response to receipt of background gamma ray pulses from gate 120 over conductor 126 at a down count input terminal 138. These pulses are presented to the down count terminal of counter 136 to represent the count of pulses during the background portion of the operating cycle.

At the initiation of the next operating cycle of the system, the pulses from analyzer 64 through the gate 118 are passed through the compensating dividing counter 130 to the up count input terminal 134 of the counter 136. The pulses at the input terminal 134 cause the counter 136 to count upwardly from the negative count previously accumulated during background counting until a zero count is reached.

At the time a zero count is reached in the counter 136, a multiple input AND gate 140 senses this condition and provides a disabling signal over a conductor 142 which is inverted by inverter 132 to block further pulses from passing through gate 128. The signal on the conductor 142 on disabling the gate 128 through inverter 132 further enables an input AND gate 146 so that further data pulses from gate 118 pass directly to a data register counter 148.

The counter 148 also receives a reset signal on conductor 98 so that at the beginning of each background portion of the operating cycle, the previous count stored in the counter 148 is erased. The counter 148 is also connected in parallel to a storage register 150 so that upon erasure of the count in the counter 148, such count is retained in storage register 150. The contents of register 150 thus represents the count of thermal neutron capture gamma rays by the formation 10 during the first time interval 114 after the emission of a burst of neutrons into the formation. This count is transferred from register 150 through a digital-to-analog converter 152 to a Σ computation circuit/log recorder 156 on line 154.

Considering now the gate 90 (FIG. 1), as has been set forth such circuit is of like construction to the Gate 88. The exception in the function of the two gates is that the gate timing circuit 110 within the gate circuit 90 has a time delay of 750 microseconds, rather than 450 milliseconds, before formation of a second pulse 158 (FIGS. 3 and 4) so that the pulse 158 permits sensing of the thermal neutron capture gamma radiation during a second discrete time interval after each neutron pulse 82. The other components of gate 90 are of like structure and function. Accordingly, a background subtraction circuit designated 122 is connected to gate 90 to provide over conductor 160 to the Σ circuit/log 156 a background compensated count representing the number of thermal neutron capture gamma rays sensed during the second time intervals defined by the pulses 158 during the measurement portion of the operating cycle of the system.

The Σ circuit 156 receives the background compensated counts from Gates 1 and 2, namely Gate 1 minus background and Gate 2 minus background, respectively, and computes and forms an output log of the macroscopic thermal neutron capture cross section Σ of the formation in accordance with the following formula:

$$\Sigma = 15.15 \ln \frac{\text{Gate 1} - \text{Bkgd.}}{\text{Gate 2} - \text{Bkgd.}} \qquad (1)$$

Figure 7:
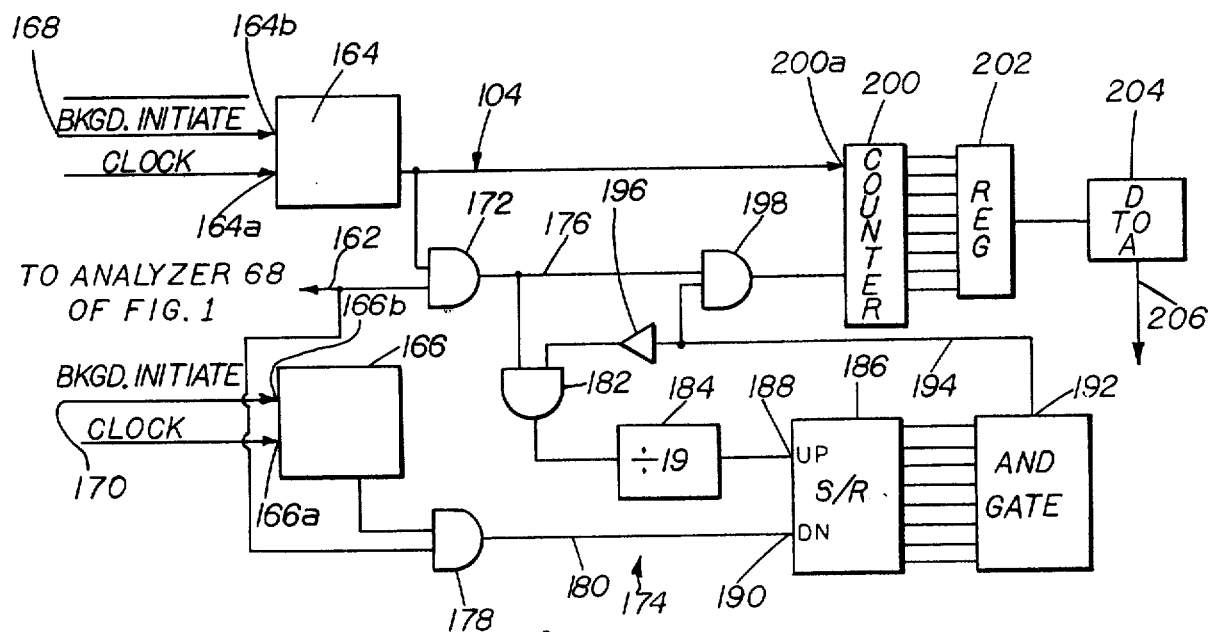

Considering now the Gate 3 and Gate 4 gating circuits 104 and 106, respectively, these circuits are of like construction and function and accordingly are exemplified by the circuit 104 of FIG. 7.

The Gate 3 gating circuit 104 receives data pulses from the analyzer 68 representing detection or capture gamma rays in the aforementioned energy range of from 1.30 to 2.92 Mev over a conductor 162. Operation of the gating circuit 104 is controlled by gate timing circuits 164 and 166 which receive the one megahertz clock signal at input terminals 164a and 166a thereof. The gate timing circuit 164 receives an inverted version of the background initiate waveform 96 via inverter 100 over a conductor 168 at an input terminal 164b. The gate timing circuit 166 receives the background initiate waveform 96 in uninverted form on conductor 170 at an input terminal 166b thereof.

The gate 164 energizes a switching gate 172 during the 950 millisecond measurement portion of the operating cycle of the system and permits data to pass to a background subtraction circuit 174 over a conductor 176 and after a five millisecond time delay subsequent to a time 96b disables gate 172. A control gate 178 permits pulses from analyzer 68 to pass into the background subtraction circuit 174, after a five millisecond time delay, over conductor 180 during the last fifty milliseconds of the fifty-five millisecond duration of the pulse 96.

Pulses from the conductor 178 pass into a disable control Gate 182 in the background subtraction circuit 174. Since the time duration of the counting of pulses from the analyzer 68 through the Gate 172 is 950 milliseconds as compared to the 50 milliseconds under control of the Gate 178, compensation for the relative time duration of the two counting intervals is made by a divide by nineteen digital frequency divider 184 which forms an output pulse in response to the receipt of nineteen input pulses thereto. The output of the divider 184 is provided to an up-down counter 186 at an up count input 188 thereof.

The counter 186, as was the case with the counter 136, counts upwardly in response to receipt of a pulse at the input terminal 188. Similarly, the counter 186 counts downwardly on receipt of pulses over the conductor 180 at a down count input terminal 190 thereof. Counter 186 counts downwardly during the background portion of each operating cycle of the system and stores therein a negative count representing the residual background radiation. At the beginning of the measurement portion of the next successive operating cycle, pulses pass through the Gates 172 and 182 through the divider 184 to the up count input terminal 188 of counter 186. Up-down counter 186 counts up until a zero count is reached. At this time a multiple input sensing AND gate 192 provides a signal over a conductor 194 through an inverter 196, disabling the gate 182 and inhibiting further pulses from passing into the divider 184 and counter 186. Simultaneously, the output from the AND gate 192 enables a gate 198 permitting pulses from the analyzer 68 to be counted in a data counter 200.

Data counter 200 is also supplied with the output signal from gate timing circuit 164 at a reset input terminal 200a thereof so that the previous count stored therein is cleared or reset at the end of each 950 millisecond measurement portion of the operating cycle. The contents of counter 200 are also transferred to a storage register 202 for storage. Register 202 transfers the counts stored therein to a digital-to-analog converter 204 which provides an analog output signal representing the count of captured gamma radiations sensed by the analyzer 68 in its assigned energy range during each measurement portion of the operating cycle. This signal is supplied via conductor 206 to a hydrogen log or recorder 208 of the conventional type used in well logging.

As has been set forth, the Gates 104 and 106 are of like construction and function. Accordingly, the background subtraction circuit and output conductor of Gate 106 are designated with a reference number 174 and 206, respectively. Gate 106 and its associated background subtraction circuit 174 provide an analog signal over the output conductor 206, in a like manner to that of Gate 104, indicating the thermal neutron capture gamma radiation sensed in the energy band of analyzer 70. This signal is indicative of the relative presence of chlorine.

It is important to note that the gating circuitry of the present invention accomplishes several functions permitting the simultaneous performance of a chlorine log and thermal neutron decay log with a single logging tool. For example, since the counts during the time intervals after each neutron burst are delayed until 450 microseconds by Gate 1 and 750 microseconds by the Gate 2, the presence of the sleeve 42 on the sonde 16 does not affect the thermal neutron decay log portion of the system.

If the delay time intervals of Gate 1 or Gate 2 after the neutron bursts were used for Gate 3 and Gate 4, the compensating effect provided by the sleeve 42 would be removed. Accordingly, with the present invention, Gate 3 and Gate 4 are timed to permit continuous counting. Thus, the nearby borehole component is preserved. Alternatively, Gates 3 and 4 can be modified so counting begins shortly after neutron burst emission.

Further, it is to be noted that background subtraction for residual radiation is performed for the counts of analyzers 68 and 70 used to log the relative presence of hydrogen and chlorine in the formation 10, allowing natural gamma ray background and detector crystal activation background to be subtracted from this portion of the log. Background compensation of the chlorine log in this manner is particularly desirable in areas where the well casing 14 has become highly radioactive due to movement of formation waters.

Summarizing the operation of the present invention, during radioactivity well logging for investigation of the of the subsurface earth formations 10 surrounding a well borehole 12, discrete bursts of high energy neutrons are emitted from the source 18 during a plurality of irradiation time intervals defined by control circuit 36 in a first 945 millisecond measurement portion of a one second operating cycle. This produces a succession of thermal neutron populations in the borehole 12 and the formations 10. The thermal neutrons are captured by the nuclei of elements in the formation and borehole and cause the elements to emit thermal neutron capture gamma rays which are detected by detector 22.

The detected radiation in a broad energy range including the capture gamma ray spectrum of from about 0.2 to about 10 Mev, or thus for substantially all elements, is sensed during the measurement portion of an operating cycle in first and second detection time intervals defined by gates 88 and 90. This information is used to obtain a measure of the rate of decay of the thermal neutron population, which is then used in Sigma circuit 156 to determine the macroscopic thermal neutron capture cross section $\Sigma$.

Simultaneously in the measurement portion of the operating cycle, the detected radiation in a first energy band (from 1.30 to 2.92 Mev) which includes a significant part of the capture gamma ray spectrum of hydrogen is sensed by analyzer 68. Also, the detected radiation in a second energy band of from 3.43 to 10.0 Mev is sensed in analyzer 70 during the measurement portion of the operating cycle.

Figure 8:
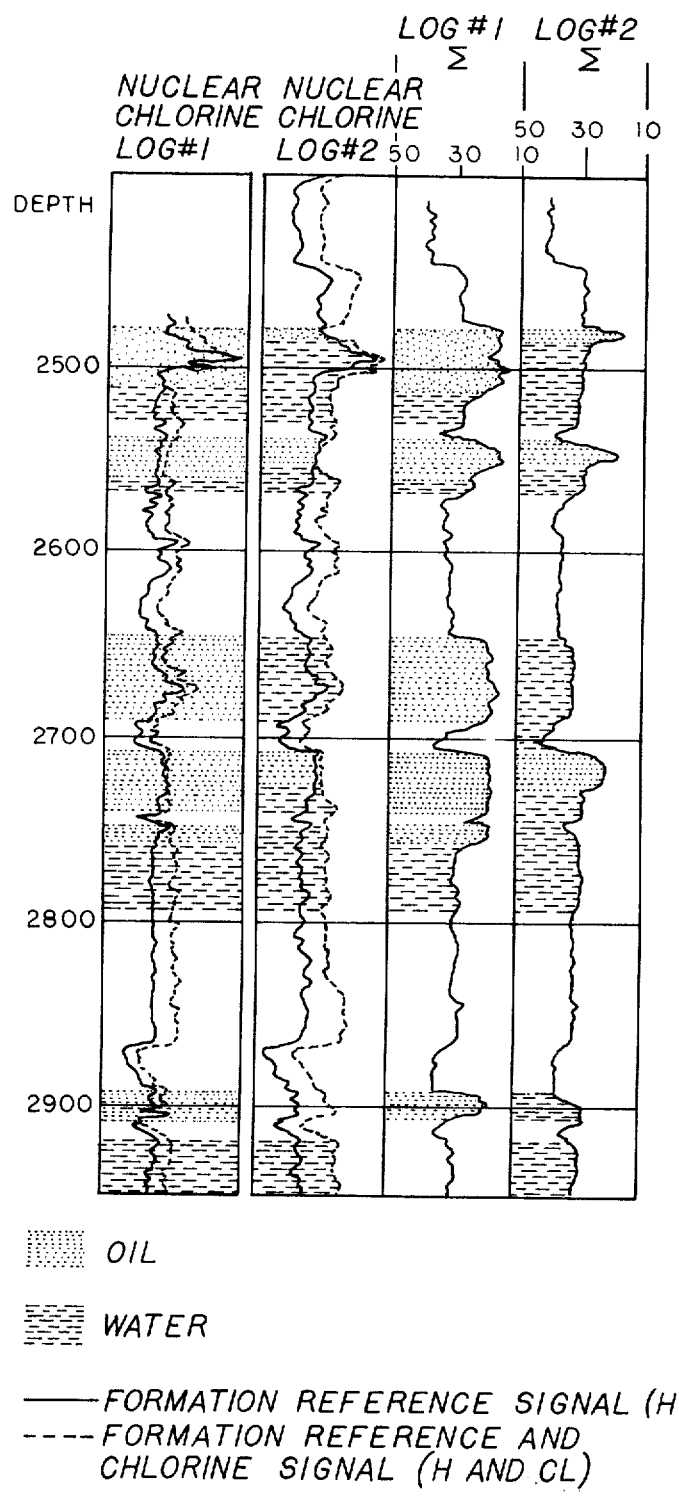
FIG. 8 is an example output record of the apparatus of the present invention.

The residual background radiation of the borehole and formation is detected during the background interval portion of each operating cycle defined by background circuit 92, subsequent to the measurement of the cycle. The residual background radiation so detected is used in background circuits 122 and 174 as a compensating factor during the derivation of both the macroscopic thermal neutron capture cross section and the determination of the relative presence of hydrogen and chlorine in the formation. Referring now to FIG. 8, there are shown typical logs that can be made by the apparatus of the present invention. For purposes of illustration it is assumed that the second log, designated No. 2, was run for some time after the first one, designated No. 1, and that the oil-water contact has changed in the interim, for example, due to depletion, as discussed hereinafter. This record shows a first trace H showing radiation intensity measured in analyzer 68 (increasing to the right as seen in the record) and representative of the hydrogen content of the formation and a second trace H & Cl showing radiation intensity measured in analyzer 70 (also increasing to the right as seen in the record) and indicative of both the hydrogen and chlorine contents of the earth formations. The response of the H trace is usually related to the porosity of the formation. Regions of corresponding deviations of the two traces indicate the presence of oil or fresh water and regions where the H and Cl signal exceeds the H signal indicate the presence of salt water. Thus, in the region just below 2705 feet there is an indication of oil, or possibly fresh water. Over a period of time the oil-salt water content at the bottom of this zone has moved from 2760 feet shown on the first chlorine log to 2725 feet shown on the second log run at a later time. In the region just below 2920 feet there is an indication of salt water saturation. In the region just below 2490 feet there is an indication of low porosity with both H and H & Cl count rates being relatively high in value. In the region just below 2650 feet, on the first chlorine log there is an indication that may be interpreted as a mixture of both salt water and oil, which on the second log may be interpreted as salt water only.

The above interpretation is enhanced by reference to $\Sigma$ Log 1 and $\Sigma$ Log 2 which represent thermal neutron decay logs run simultaneously with Chlorine Logs 1 and 2, respectively. Attention is directed to corresponding depths to those discussed above with respect to Chlorine Log 1 and 2 and particularly to those portions of $\Sigma$ Log 2 showing an increase of $\Sigma$ from Log 1 to Log 2 and indicative of increases in the relative presence of salt water in the formation.

Although the two logging signals indicating the hydrogen content and hydrogen and chlorine content, respectively, are shown recorded on the same chart, it is to be understood that they are recorded as individual traces on separate logging charts, with the two records being interpreted by overlaying one with respect to the other in order that corresponding variations and differences between the respective logs may be interpreted.

It is also contemplated that, instead of recording both the hydrogen and the hydrogen and chlorine signals individually, only one of the two signals, preferably the hydrogen content signal, may be recorded together with a second correlated signal showing the ratio or difference between the hydrogen and hydrogen and chlorine signals.

It is to be understood that the logging signals may be recorded magnetically on tapes or discs and may be submitted to a computer either in analog or digital format, wherein appropriate mathematical or computer techniques may be employed to provide a resultant signal representing difference or otherwise showing variations between the signals, or which may be a plot of one against the other.

The foregoing disclosure and description of the invention are illustrative and explanatory thereof, and various changes in the size, shape, and materials as well as in the details of the illustrated construction may be made without departing from the spirit of the invention.

What is claimed is:

1. A method of radioactivity well logging to investigate subsurface earth formations in the vicinity of a well borehole, comprising the steps of:
   a. repetitively emitting discrete time interval bursts of high energy neutrons from a logging instrument having a pulsed neutron source and a gamma ray detection portion in the borehole during a measurement portion of an operating cycle having a measurement portion and a background portion to bombard the earth formations and produce a succession of thermal neutron populations in the borehole and formations;

b. detecting gamma radiation in an energy range including the capture gamma ray spectrum of substantially all elements during first and second discrete detection time intervals occurring at different times after each of the repetitive irradiation time intervals during the measurement portion of the operating cycle;

c. detecting gamma radiation in a first energy sub-range including a significant part of the capture gamma ray spectrum of hydrogen during substantially all of the measurement portion of the operating cycle;

d. detecting gamma radiation in a second energy sub-range including a significant part of the neutron capture gamma ray spectrum of chlorine which is distinct from that of hydrogen during substantially all of the measurement portion of the operating cycle;

e. deriving from the gamma radiation detected during the first and second discrete detection time intervals occurring after each of the repetitive irradiation time intervals an indication of the macroscopic thermal neutron capture cross section of the formation;

f. simultaneously deriving from the gamma radiation detected in said first and second energy sub-ranges, a measure of the relative presence of hydrogen and chlorine in the formation; and g. shielding the detector portion of the logging instrument with a material having the characteristic of emission of thermal neutron capture gamma radiation predominantly within said first energy sub-range and substantially outside said second energy sub-range.

2. The method of claim 1, further including the step of:
detecting during a background portion of the operating cycle, occurring subsequent to the measurement portion of the cycle to permit thermal neutron capture gamma radiation to have substantially declined, the residual background gamma radiation of the borehole and formations.

3. The method of claim 2, further including the step of:
compensating for the detected residual background radiation in said step of deriving an indication of the macroscopic thermal neutron capture cross section of the formation.

4. The method of claim 2, further including the step of:
compensating for the detected residual background gamma radiation in said step of simultaneously deriving a measure of the relative presence of hydrogen and chlorine in the formation.

5. The method of claim 1, wherein said step of detecting gamma radiation in an energy range including the capture gamma ray spectrum of substantially all elements comprises the step of:
detecting gamma radiation resulting from thermal neutron capture in the energy range of from about 0.2 Mev to about 10 Mev.

6. The method of claim 1, wherein said step of detecting gamma radiation in a first energy sub-range comprises the step of:

detecting gamma radiation resulting from thermal neutron capture in the energy band of from above 1 Mev to below 3 Mev.

7. The method of claim 6, wherein said step of detecting gamma radiation in a first energy sub-range comprises the step of:
detecting gamma radiation resulting from thermal neutron capture in the energy band of from 1.3 Mev to 2.92 Mev.

8. The method of claim 1, wherein said step of detecting gamma radiation in a second energy sub-range comprises the step of:
detecting gamma radiation resulting from thermal neutron capture in the energy band of from above 3 Mev to at least 8 Mev.

9. The method of claim 8, wherein said step of detecting gamma radiation in a second energy sub-range comprises the step of:
detecting gamma radiation resulting from thermal neutron capture in the energy band of from 3.43 Mev to 10.0 Mev.

10. The method of claim 1, further including the steps of:
a. forming an output record as a function of borehole depth of the derived indication of the macroscopic thermal neutron capture cross section of the formation; and
b. forming an output record as a function of borehole depth of the derived measure of the relative presence of hydrogen and chlorine in the formation.

11. The method of claim 1 wherein said shielding step is performed by placing a shielding sleeve comprised of a bonded coating of samarium oxide ($Sm_2O_3$) about the detector portion of the logging instrument.

12. Apparatus for radioactivity well logging to investigate subsurface earth formations in the vicinity of a well borehole, comprising:
a. means for emitting discrete bursts of high energy neutrons in the borehole during a plurality of discrete irradiation time intervals during a measurement portion of an operating cycle having a measurement portion and a background portion to bombard the earth formations and produce a timewise succession of thermal neutron populations in the borehole and formations;

b. means for detecting gamma radiation resulting from the capture of the thermal neutron populations by the nuclei of materials in the vicinity of the borehole;

c. means for sensing from the detected gamma radiation the thermal neutron capture gamma radiation in an energy range including the capture gamma ray spectrum of substantially all elements during first and second discrete detection time intervals occurring at different times after each of the discrete irradiation time intervals during the measurement portion of the operating cycle and for generating first signals representative thereof;

d. means for sensing from the detected gamma radiation the thermal neutron capture gamma radiation in a first energy sub-range including a significant part of the neutron capture gamma ray spectrum of hydrogen during substantially all of the measurement portion of the operating cycle and for generating second signals representative thereof;

e. means for sensing from the detected gamma radiation the thermal neutron capture gammma radiation in a second energy sub-range including a significant part of the neutron capture gamma ray spectrum of chlorine which is distinct from that of hydrogen during substantially all of the measurement portion of the operating cycle and for generating third signals representative thereof;

f. means for deriving from said first representative signals sensed during the first and second discrete detection time intervals, an indication of the macroscopic thermal neutron capture cross section of the formation;

g. means for simultaneously deriving from said second and third representative signals sensed in the first and second energy sub-ranges a measure of the relative presence of hydrogen and chlorine in the formation;

h. means for deriving during the background portion of an operating cycle fourth signals representative of substantially only the residual background radiation present in the vicinity of the detector portion of the logging instrument; and i. means for shielding the detector portion of the logging instrument with a material having the characteristic of emission of thermal neutron capture gamma radiation predominantly within said first energy sub-range and substantially outside said second energy sub-range.

13. The apparatus of claim 12, wherein said shielding means comprises a sleeve of bonded particulate samarium oxide ($Sm_2O_3$).

14. The apparatus of claim 12, wherein said means for deriving the macroscopic thermal neutron capture cross section further includes:

means for compensating said first, second and third representative signals for the detected residual background radiation.

15. The apparatus of claim 12, wherein said means for simultaneously deriving a measure of the relative presence of hydrogen and chlorine in the formation further includes:

means for compensating said first, second and third representative signals for the detected residual background radiation.

16. The apparatus of claim 12, wherein said means for sensing gamma radiation in an energy range including the capture gamma ray spectrum of substantially all elements, comprises:

means for sensing gamma radiation resulting from thermal neutron capture in the energy range of from about 0.2 Mev to about 10 Mev.

17. The apparatus of claim 12, wherein said means for sensing gamma radiation in a first energy sub-range comprises:

means for sensing gamma radiation resulting from thermal neutron capture in the energy range of from about 1 Mev to below 3 Mev.

18. The apparatus of claim 12, wherein said means for sensing radiation in a second energy sub-range comprises:

means for sensing gamma radiation resulting from thermal neutron capture in the energy range of from above 3 Mev to at least 8 Mev.

19. The apparatus of claim 12, further including:

a. means for forming an output record of the derived indication of the macroscopic thermal neutron capture cross section of the formation as a function of borehole depth; and b. means for forming an output record of the derived measure of the relative presence of hydrogen and chlorine in the formation as a function of borehole depth.

* * * * *